(12) United States Patent
Lehtinen et al.

(10) Patent No.: US 6,518,957 B1
(45) Date of Patent: Feb. 11, 2003

(54) COMMUNICATIONS DEVICE WITH TOUCH SENSITIVE SCREEN

(75) Inventors: Kari Lehtinen, Tampere (FI); Kai Kronstrom, Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 140 days.

(21) Appl. No.: 09/634,739

(22) Filed: Aug. 8, 2000

(30) Foreign Application Priority Data

Aug. 13, 1999 (GB) .............................. 9919213

(51) Int. Cl.⁷ ................................ G09G 5/00
(52) U.S. Cl. .................. 345/173; 345/168; 379/433.06; 379/433.07
(58) Field of Search ...................... 379/433.06, 433.07; 345/173, 174, 175, 179, 156, 157, 168, 169; 455/566, 90

(56) References Cited

U.S. PATENT DOCUMENTS

| | | | | |
|---|---|---|---|---|
| 4,992,799 A | * | 2/1991 | Sugino et al. | 340/712 |
| 5,483,262 A | * | 1/1996 | Izutani | 345/179 |
| 5,526,422 A | | 6/1996 | Keen | 345/173 |
| 5,555,286 A | | 9/1996 | Tendler | 379/59 |
| 5,584,054 A | | 12/1996 | Tyneski et al. | |
| 5,715,524 A | | 2/1998 | Jambhekar et al. | |
| 5,742,894 A | | 4/1998 | Jambhekar et al. | |
| 5,881,377 A | * | 3/1999 | Giel et al. | 455/343 |
| 5,973,677 A | * | 10/1999 | Gibbons | 345/179 |
| 6,208,331 B1 | * | 3/2001 | Singh et al. | 345/173 |
| 6,233,464 B1 | * | 5/2001 | Chmaytelli | 455/556 |
| 6,246,862 B1 | * | 6/2001 | Grivas et al. | 455/90 |
| 6,266,050 B1 | * | 7/2001 | Ohet | 345/173 |
| 6,339,643 B1 | * | 1/2002 | Mastrocola et al. | 379/368 |

FOREIGN PATENT DOCUMENTS

| | | |
|---|---|---|
| EP | 0449471 A3 | 10/1991 |
| EP | 0449471 A2 | 10/1991 |
| JP | 8139799 | 5/1996 |
| JP | 918566 | 1/1997 |
| WO | WO9829959 | 7/1998 |

* cited by examiner

*Primary Examiner*—Dennis-Doon Chow
(74) *Attorney, Agent, or Firm*—Antonelli, Terry, Stout & Kraus, LLP

(57) ABSTRACT

A portable communications device which includes: a housing 4, a display for entering and displaying data, the display being disposed in the housing and having a touch sensitive screen, radio circuitry for receiving and processing communication channel data and a processor for controlling operation of the device. When a voice communication channel is established, the processor is operable to disable at least a portion of the touch sensitive screen.

25 Claims, 2 Drawing Sheets

COMMUNICATIONS DEVICE WITH TOUCH SENSITIVE SCREEN

BACKGROUND OF THE INVENTION

1. Field of the Invention

This invention relates to a communications device and in particular to a communications device having a touch sensitive screen.

2. Description of the Prior Art

Examples of devices with touch sensitive screens are personal digital assistants (PDA), communicators, laptops and radio telephone handsets.

SUMMARY OF THE INVENTION

In accordance with the invention there is provided a communications device comprising: a housing; a display for entering and displaying data, said display being disposed in said housing and having a touch sensitive screen; circuitry for receiving and processing voice call data; and a processor for controlling operation of the device, wherein when a voice communication channel is established, the processor is operable to disable at least a portion of the touch sensitive screen.

Preferably the processor is operable to disable all of the touch sensitive screen apart from a pre-defined area. This pre-defined area may include a touch area that is operable, when touched, to enable the touch sensitive screen.

The processor may be operable to disable the touch sensitive screen when a user initiates a voice call. Thus when a user puts the device into an off-hook mode; the touch sensitive screen may be disabled.

The processor may be operable to disable the touch sensitive screen when the device starts to establish a voice call. Thus when a user dials a number to be called, the processor disables the touch sensitive screen when the device commences dialing the number input by a user.

Preferably the processor is operable to disable the touch sensitive screen when a called party answers a voice call initiated from the device.

The processor may be operable to disable the touch sensitive screen when a voice call is received by the device. Thus when a user of the device selects the off-hook condition in response to an incoming voice call, the touch sensitive screen is disabled.

The device may also include a data input apparatus for entering data via the touch sensitive screen. Such a data input apparatus may be a stylus or the like. The data input apparatus may be attachable to the device in a fixed manner and the processor may be operable to enable the touch sensitive screen when the data input apparatus is detached from a fixed position thereof relative to the device. The processor may be operable to disable the touch sensitive screen when the data input apparatus is replaced in its fixed position on or in the device.

Preferably, the device also includes means for over-riding the disablement provided by the processor. Thus a user can choose to over-ride the disablement of the touch sensitive screen and use the functionality thereof during a voice call.

The invention is applicable to any communications device having a touch sensitive screen and is particularly applicable to portable communications devices. Such devices may be a radio communications device, such as a portable radiotelephone, or a personal digital assistant.

BRIEF DESCRIPTION OF THE DRAWINGS

The invention is now described by way of example only with reference to the accompanying drawings in which.

DETAILED DESCRIPTION OF THE PREFERRED EMBODIMENTS OF THE INVENTION

Figure 1:
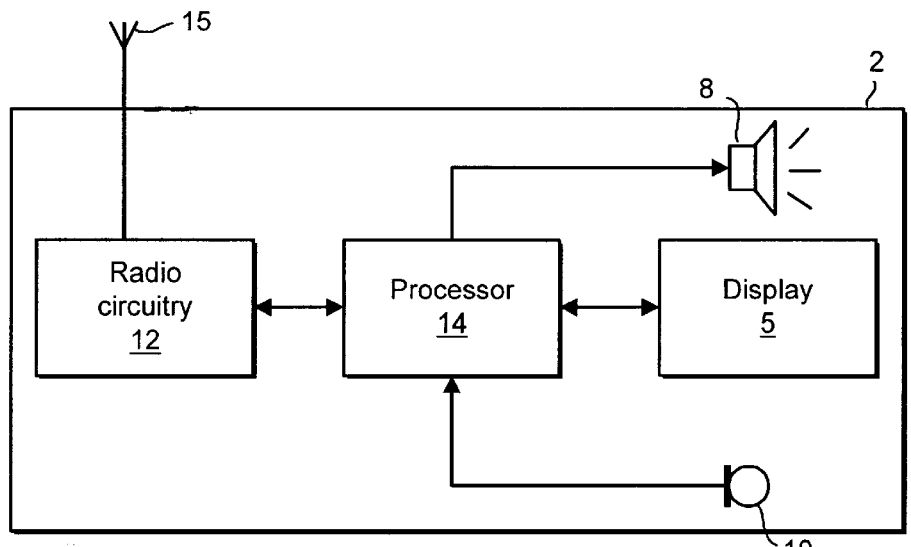
FIG. 1 shows the functional elements of a first embodiment of a portable radio telecommunications device in accordance with the invention.

FIG. 1 shows the functional elements of a first embodiment of a portable radio communications device according to the invention. The device 2 includes the usual components necessary for a device for radio communication with voice capability e.g. a display 5, a loudspeaker 8, a microphone 10, radio circuitry 12, processing circuitry 14 and an antenna 15.

Figure 2:
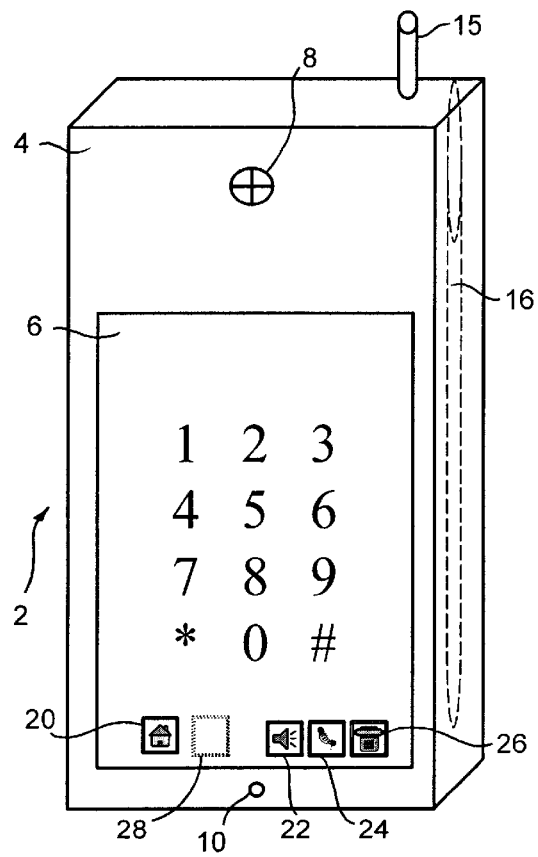
FIG. 2 shows a view of a first embodiment of a portable radio telecommunications device in accordance with the invention.

FIG. 2 shows a view of a first embodiment of the invention. The device 2 comprises a main body 4 housing the display having a touch sensitive screen 6. A stylus 16 is provided for inputting data to the device via the touch sensitive screen 6.

Figure 3:
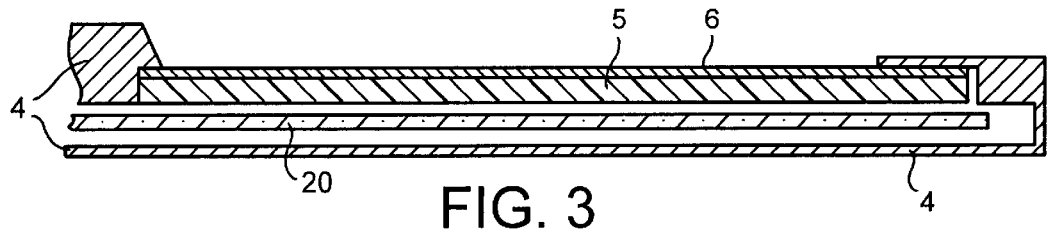
FIG. 3 shows a partial cross-sectional view of the device shown in FIG. 2.

FIG. 3 shows, in cross-section, the device shown in FIG. 2. The main body 4 houses a display and a board 20 for the electronics of the device. The display comprises a conventional display apparatus 5 (e.g. a LCD display) and a touch sensitive screen 6 for indicating to the processor 14 of the device when pressure has been applied to or removed from the touch sensitive screen 6. The touch sensitive screen covers one surface of the display apparatus. The touch sensitive screen may be made from any suitable material e.g. resistive material, characteristics of which alter when pressure is applied to the screen.

The board 20 includes the control circuitry for the touch sensitive screen 6 as well as the circuitry for the communications functionality of the device (i.e. the radio circuitry 12 and processing circuitry 14).

Referring to FIG. 2, the display 5 is shown in the telephony mode: the digits 0 to 9 are displayed on the display apparatus 5 and soft keys 20, 22, 24 and 26 are also provided which define telephony functionality. Soft key 20 selects details of the phone numbers stored in the device; soft key 22 selects hands-free operation; soft key 24 (the SEND key) selects an off-hook condition (i.e. the control channel is open); and soft key 26 (the END key) selects an on-hook condition (i.e. terminates a voice call). The device may have this functionality provided in other ways e.g. by also providing a mechanical keypad for data input and selection. The way in which the telephone functionality is implemented is not fundamental to the invention.

In radio communications, there is a Control Channel and a Communication Channel. A Mobile Entity (ME) (e.g. a radio handset) communicates with a Radio Access Network (RAN) by using some form of Control Channel and Communication Channel.

In the case of a call originating from the device, the user of the device 2 initiates a call by using device specific means through the Man Machine Interface (MMI). In the embodiment shown in FIG. 2, a call originating from the device is achieved by the user entering the destination number by means of the digits 0 to 9 or selecting a recipient from the list stored in the memory of the device by means of the soft key 20 followed by selecting the send key 24. Then processor 14 opens a Control Channel to the radio access network (RAN) and negotiates with appropriate network components in order to establish a call. Some other means of input (e.g. a mechanical keyboard may be used).

A voice call can be terminated by the device or the RAN. In both cases the terminating party signals the other end via the Control Channel that the call is to be terminated.

A Mobile Terminating (MI) call is detected when the RAN sends a page to the device to open a Communication Channel.

When the radio circuitry 12 detects that an incoming call is being received, the processor 14 outputs a signal to alert a user to the incoming call. This signal may be sent to the loudspeaker 8 to provide an audible alert, to the display 5 to provide a visual alert and/or to a vibrating battery (for example) to provide a tactile alert. If the user chooses to answer the incoming call, the user selects the off-hook soft key 24 and the voice call is established.

When the processor 14 detects that the user has selected to answer the call (e.g. by selecting the off-hook soft-key 24), the processor disables the touch sensitive screen 6. Thus if the device is positioned such that the loudspeaker is close to the ear of a user, it is not possible for the ear or the cheek of the user to accidentally activate an application during a voice call by means of the touch sensitive screen 6.

When the call is terminated, the processor detects the termination of the call and enables the touch sensitive screen 6. The call may be terminated in a number of ways. For instance a mechanical END key may be provided.

The device may be provided with a means for overriding the automatic disablement of the touch sensitive screen by the processor. This may comprise a mechanical button on the device which, when selected, causes the touch sensitive screen to be enabled. Thus a user is able to use the PDA functions of the device even if a voice call is in progress. Alternatively the override may be provided by movement of a cover (if one is provided) from a first, closed position to a second, open position.

In the embodiment shown in FIG. 2, a soft key 28 is displayed by the display apparatus 5 when the touch sensitive screen is disabled. The area of the touch sensitive screen overlying this soft key 28 remains active during a voice call. If the user wishes to re-activate the main area of the touch sensitive screen 6 during a call, the user touches this soft key 28 which then causes the touch sensitive screen to become enabled. The user may then select the END key 26. The position of this override key 28 should be selected to be in an area of the touch sensitive screen 6 that is least likely to be contacted accidentally by a user during a call.

If the user wishes to use the device in a hands-free manner, the user selects the hands-free soft key 22. This selection is detected by the processor 14 and in response the audio output is provided via a dedicated hands-free loudspeaker (not shown). Alternatively, if a headset earpiece is connected to the device, this over-rides the automatic do-activation of the touch-screen when an call is to be established. Thus, with the headset connected to the device, a user can continue to use the functionality available via the touch sensitive screen during a voice call.

Figure 4:
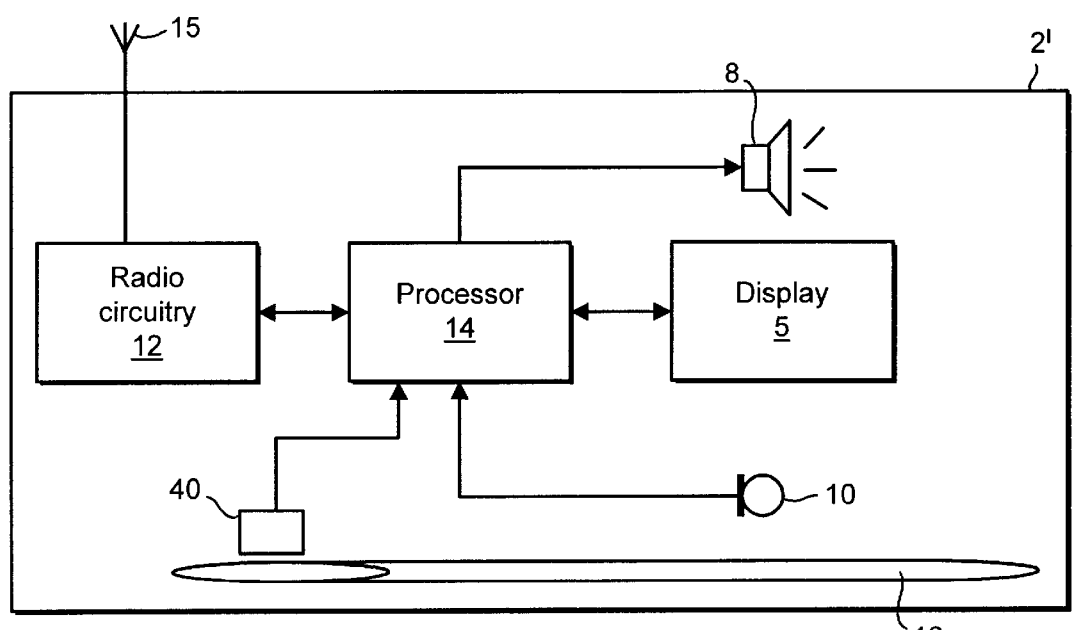
FIG. 4 shows the functional elements of a second embodiment of a portable radio telecommunications device in accordance with the invention.

FIG. 4 shows the functional elements of a second embodiment of the invention. A detector 40 is provided for activating the screen when the stylus 16 is removed from its fixed position on or in the device. In the embodiments shown in FIG. 2 and FIG. 4, the stylus is held within a channel in the housing 4 of the device. However the stylus could simply be fixedly connected in a detachable manner to the exterior of the housing 4.

The detector 40 may be of any suitable form e.g. mechanical, optical or electromechanical means. When the stylus is removed from the channel this is detected by the detector 40 and a signal is passed to the processor 14. In response, the processor 14 enables the touch sensitive screen 6, either fully or in the area of the override soft key 28. When the stylus is returned to its stored position, the detector 40 detects this and sends a signal to the processor 14 which, in response, disables the touch sensitive screen 6. The signal from the detector 40 may also be used by the processor 14 to control other applications in the device. Examples of such applications are: the enabling of an icon on the touch screen indicating that the stylus has been removed; and the provision of an audible alert to the user, after a predetermined time of de-activation, that the stylus has not been replaced in the stored position.

As well as the user interface being provided by means of a touch sensitive screen, the device may also include other user interface means, for example a mechanical keypad or voice input. The device may also be arranged to disable these means of user interface when a voice call is in progress.

The invention is applicable to any communications device having a touch sensitive screen. Examples of such devices are radio telephone handsets, personal organizers, communicators, laptops etc. The invention is particularly applicable to mobile, wireless communication devices but may also be applied to wired communication devices.

The present invention relates to a communications device that has a main body housing a touch sensitive screen. The device may have a movable cover, which in a first, closed position, obscures at least a portion of the touch sensitive screen. When the cover is in the second, open, position, the touch sensitive screen is exposed. In the case of a device having radio telecommunications capability, moving the cover from a closed position may result in the establishment of a communication channel.

What is claimed is:

1. A communications device comprising:

a housing;

a display which enters and displays data, the display being disposed in the housing and having a touch sensitive screen;

radio circuitry which receives and processes voice call data; and a processor which controls operation of the device which, in response to voice communication channel being established, is operable to disable at least a portion of the touch sensitive screen.

2. A device according to claim 1 wherein:

the processor is operable to disable all of the touch sensitive screen apart from a pre-defined area.

3. A device according to claim 2 wherein:

the pre-defined area of the touch sensitive screen includes an area that is operable, when touched, to enable the touch sensitive screen.

4. A device according to claim 1 comprising:

a data input apparatus which enters data via the touch sensitive screen, the data input apparatus being attachable to the device wherein the processor is operable to enable the touch sensitive screen when the data input apparatus is removed from the device.

5. A device according to claim 4 wherein:

the processor is operable to cause an icon to be displayed on the display when the data input apparatus is removed from the device, the icon indicating that the data input apparatus is removed.

6. A device according to claim 4 wherein:

the processor is operable to cause an audible alert to be produced when the data input device is not re-attached to the device after a predetermined time of disablement.

7. A device according to claim 1 comprising:

a data input apparatus for entering data via the touch sensitive screen, the data input apparatus being attachable to the device wherein the processor is operable to disable the touch sensitive screen when the data input apparatus is attached to the device.

8. A device according to claim 7, wherein:

the processor is operable to cause an icon to be displayed on the display when the data input apparatus is removed from the device, the icon indicating that the data input apparatus is removed.

9. A device according to claim 7, wherein:

the processor is operable to cause an audible alert to be produced when the data input device is not re-attached to the device after a predetermined time of disablement.

10. A device according to claim 1 comprising:

means for over-riding the disablement provided by the processor.

11. A device according to claim 1 wherein:

the device is portable.

12. A device according to claim 1 wherein:

the device is a radiotelephone.

13. A communications device comprising:

a housing;

a display which enters and displays data, the display being disposed in the housing and having a touch sensitive screen;

radio circuitry which receives and processes voice call data; and a processor which controls operation of the device which is operable to disable the touch sensitive screen in response to a user initiating a voice call.

14. A device according to claim 13 wherein:

the processor is operable to disable all of the touch sensitive screen apart from a pre-defined area.

15. A device according to claim 14 wherein:

the pre-defined area of the touch sensitive screen includes an area that is operable, when touched, to enable the touch sensitive screen.

16. A communications device comprising:

a housing;

a display which enters and displays data, the display being disposed in the housing and having a touch sensitive screen;

radio circuitry which receives and processes voice call data; and a processor which controls operation of the device which is operable to disable the touch sensitive screen in response to the device starting dialing to establish a voice communication.

17. A device according to claim 16 wherein:

the processor is operable to disable all of the touch sensitive screen apart from a pre-defined area.

18. A device according to claim 17, wherein:

the pre-defined area of the touch sensitive screen includes an area that is operable, when touched, to enable the touch sensitive screen.

19. A communications device comprising:

a housing;

a display which enters and displays data, the display being disposed in the housing and having a touch sensitive screen;

radio circuitry which receives and processes voice call data; and a processor which controls operation of the device which is operable to disable the touch sensitive screen in response to a voice call being received by the device.

20. A device according to claim 19, wherein:

the processor is operable to disable all of the touch sensitive screen apart from a pre-defined area.

21. A device according to claim 20 wherein:

the pre-defined area of the touch sensitive screen includes an area that is operable, when touched, to enable the touch sensitive screen.

22. A communications device comprising:

a housing;

a display which enters and displays data, the display being disposed in the housing and having a touch sensitive screen;

radio circuitry which receives and processes voice call data; and a processor which controls operation of the device which is operable to disable the touch sensitive screen in response to a voice call being answered in response to a user input.

23. A device according to claim 22, wherein:

the processor is operable to disable all of the touch sensitive screen apart from a pre-defined area.

24. A device according to claim 23 wherein:

the pre-defined area of the touch sensitive screen includes an area that is operable, when touched, to enable the touch sensitive screen.

25. A method of operating a portable communications device comprising a display for entering and displaying data, the display having a touch sensitive screen, the method comprising:

receiving and processing voice call data; and controlling operation of the device with a processor which, in response to a voice communication channel being established, is operable to disable at least a portion of the touch sensitive screen.

* * * * *